US012625779B2

(12) United States Patent
Casey et al.

(10) Patent No.: US 12,625,779 B2
(45) Date of Patent: May 12, 2026

(54) AUTOMATED RECONSTRUCTION AND ATTRIBUTION OF DATA MODIFICATIONS

(71) Applicant: Salesforce, Inc., San Francisco, CA (US)

(72) Inventors: Eoghan Casey, Baltimore, MD (US); Jason K. S. Choy, Short Hills, NJ (US)

(73) Assignee: Salesforce, Inc., San Francisco, CA (US)

( * ) Notice: Subject to any disclaimer, the term of this patent is extended or adjusted under 35 U.S.C. 154(b) by 270 days.

(21) Appl. No.: 18/477,378

(22) Filed: Sep. 28, 2023

(65) Prior Publication Data

US 2025/0110839 A1 Apr. 3, 2025

(51) Int. Cl.
*G06F 11/1446* (2026.01)

(52) U.S. Cl.
CPC ...... *G06F 11/1469* (2013.01); *G06F 11/1451* (2013.01)

(58) Field of Classification Search
CPC .......................... G06F 11/1469; G06F 11/1451
See application file for complete search history.

(56) References Cited

U.S. PATENT DOCUMENTS 10,083,299 B2 * 9/2018 Crofton ................. G06F 21/566

OTHER PUBLICATIONS

Guido et al., "Generating a Corpus of Mobile Forensic Images for Masquerading user Experimentation," Journal of Forensic Sciences, Nov. 2016, 61(6):1467-1472.

* cited by examiner

*Primary Examiner* — Hosain T Alam
*Assistant Examiner* — Alan Otto

(57) ABSTRACT

Methods, systems, and apparatus, including computer programs, encoded on computer storage media, for automated data modification reconstruction and attribution. One of the methods includes determining two or more net modifications between a first backup and a second backup; attributing, for each of the two or more net modifications, the net modification to an entity from a plurality of entities; determining, for an event of interest and using first data that indicates the net modifications, a likelihood that a modification during the event of interest is attributable to a first entity; determining whether the likelihood satisfies a likelihood criterion; and performing, in response to determining that the likelihood satisfies the likelihood criterion, an action for the event of interest using second information for the first entity and the modification.

20 Claims, 2 Drawing Sheets

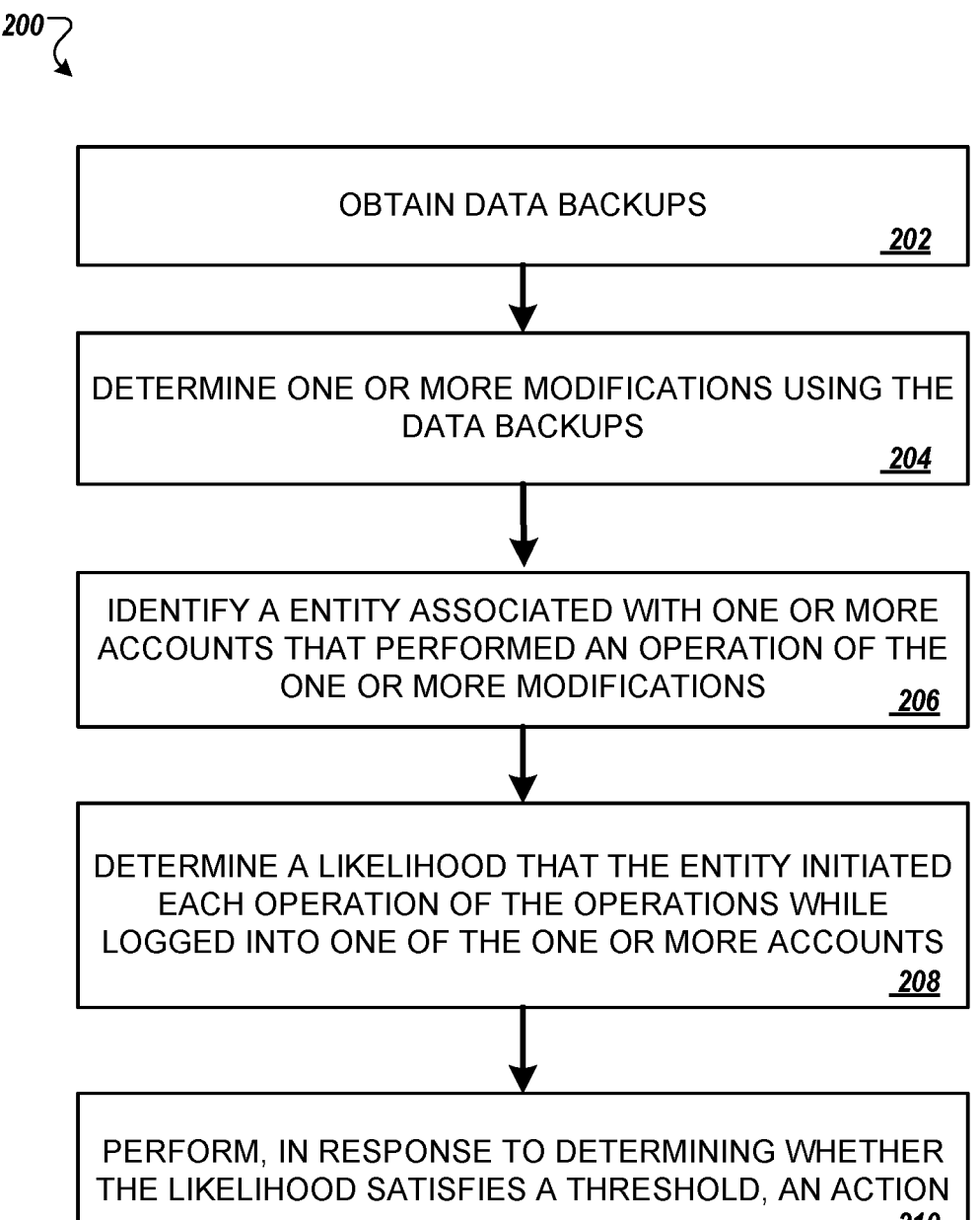

*200*

OBTAIN DATA BACKUPS

202

DETERMINE ONE OR MORE MODIFICATIONS USING THE DATA BACKUPS

204

IDENTIFY A ENTITY ASSOCIATED WITH ONE OR MORE ACCOUNTS THAT PERFORMED AN OPERATION OF THE ONE OR MORE MODIFICATIONS

206

DETERMINE A LIKELIHOOD THAT THE ENTITY INITIATED EACH OPERATION OF THE OPERATIONS WHILE LOGGED INTO ONE OF THE ONE OR MORE ACCOUNTS

208

PERFORM, IN RESPONSE TO DETERMINING WHETHER THE LIKELIHOOD SATISFIES A THRESHOLD, AN ACTION

AUTOMATED RECONSTRUCTION AND ATTRIBUTION OF DATA MODIFICATIONS

BACKGROUND

Various systems can create a backup of information stored on the system that captures an historical snapshot in time. For instance, a system that includes a database can backup data or metadata from the database. Similarly, a system that includes digital files can backup information from the system.

SUMMARY

Sometimes an event can impact information stored in electronic form, over a network, e.g., cloud environments. Some examples of events of interest can include data destruction or corruption, information theft or encryption, or a combination of these. These types of events can generally be referred to as information accesses, which can include information modifications. Although some of the examples described throughout this specification generally refer to information modifications, similar examples apply to other types of information access. When an event occurs, the observed modifications (e.g., additions, alterations, or deletions) indicate what information was impacted, and can be used to, at least partially, reconstruct what happened, whether the event was intentional or inadvertent, or directly or indirectly affected the information. In some examples, the observed modifications can be used to restore information affected by an event of interest as part of the reconstruction process.

A reconstruction system can reconstruct an event of interest. A reconstructed event can include details indicating one or more operations performed on information stored in memory, an attribution of one or more operations to one or more entities (e.g., users, businesses, automations, robots, animals), a score indicating a likelihood that the attribution of one or more operations to an entity is correct, or a combination of these. Operations can be performed by entities through accounts. Because some accounts can be accessible by more than one entity, and some entities can switch accounts, the systems and techniques described in this specification can use contextual data to determine which of the one or more entities are responsible for a given modification.

The reconstruction system can extract details about modifications of information stored in cloud environments. A cloud environment can store information for one or more components, e.g., storage systems. Although discussed from the perspective of historical information for a single component, the reconstruction system can perform similar operations for multiple different components that use the same cloud environment, different cloud environments, or a combination of both.

Although some examples are discussed with respect to a cloud environment, similar processes can be performed for other types of backup systems. History details extracted from a cloud environment can include a specific modification to certain information and can identify one or more accounts or entities that performed operations causing the specific modification—e.g., by an identifier of an account.

In general, data, which can include metadata, about modifications of information stored in cloud environments do not necessarily provide a full context of what occurred leading up to one or more information modifications. For example, details about modifications of cloud information may not include whether a given entity switched to another account before modifying information. In some cases, given discrete backups of information, a system does not have complete knowledge of all individual modifications to the information that occurred between backups but rather only two different instances of the information, which could have been modified by multiple entities at multiple different times between the two backups, e.g., using corresponding accounts. As a result, a system might not have a complete timeline of all modifications to the information. With uncertainties in modifications, an entity that caused an event of interest might not be evident from the stored data about cloud information modifications.

To more accurately determine a source of a modification or other information accesses, e.g., an entity that caused an event of interest, systems described in this specification can reconstruct an entity-centric sequence of events of modifications within an information storage system. The systems can use such entity-centric reconstruction to link one or more modifications to an entity. For instance, instead of a timeline that indicates modifications made to particular information at particular times, the reconstruction system can attribute modifications to specific entities with access to one or more accounts associated with the modifications. The reconstruction system can create a sequence of events that shows what modifications to information were likely made by which entity and the likelihood of such attributions being accurate.

The reconstruction system can generate, for any particular entity or account, a sequence of events using one or more of: (i) past modifications of information performed by the entity or account; (ii) other modifications performed within a threshold time period around a time of an event of interest— e.g., an addition, alteration, or suppression of cloud information; (iii) other information linked to modifications resulting from the event; (iv) other modifications in a same class (e.g., data corruption, addition, among others); or (v) a combination of these.

In some implementations, reconstruction of historical entity- or account-level activity supports trend and time series analysis to detect deviations or anomalies that might indicate a change in behavior, an entity masquerading as another entity, or a combination of both.

In some implementations, reconstruction of historical relational activities supports root cause analysis and forward tracking—e.g., error propagation. For instance, when a problem is detected in later information, systems can analyze previous information to determine a likely root cause— e.g., which entity likely modified what information and when. Once a likely root cause is determined, systems can perform analysis of information to determine if other errors were propagated from a root cause.

In general, one aspect of the subject matter described in this specification can be embodied in methods that include the actions of determining, using a first backup of information that was stored in a storage system during a first time period and a second backup of information that was stored in the storage system during a second time period, two or more net modifications between the first backup and the second backup; attributing, for each of the two or more net modifications, the net modification to an entity from a plurality of entities and that made a most recent change reflected in the net modification; determining, for an event of interest and using first data that indicates the net modifications attributed to each of the corresponding entities, a likelihood that a modification during the event of interest is attributable to a first entity from the plurality of entities, where the event of interest includes an access to information in the storage system; determining whether the likelihood satisfies a likelihood criterion; and performing, in response to determining that the likelihood satisfies the likelihood criterion, an action for the event of interest using second information for the first entity and the modification.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations, determining the likelihood includes: detecting, from the plurality of entities and using the first information that indicates the net modifications attributed to each of the corresponding entities, a subset of entities that each made at least one modification from the two or more net modifications between the first backup and the second backup; and determining, for two or more entities in the subset of entities, a corresponding likelihood that the modification during the event of interest is attributable to the corresponding entity. In some implementations, the likelihood criterion includes a likelihood threshold or a highest likelihood from the corresponding likelihoods for the subset of entities. In some implementations, detecting the subset of entities includes detecting the subset of entities that each likely made at least one modification during the event of interest.

In some implementations, actions include determining, for the event of interest and using the first information that indicates the net modifications attributed to each of the corresponding entities, a second likelihood that a second modification during the event of interest is attributable to a second entity from the plurality of entities; determining whether the second likelihood satisfies the likelihood criterion; and using a result of the determination whether the second likelihood satisfies the likelihood criterion, determining whether to perform a second action for the event of interest using third data for the second entity and the second modification.

In some implementations, performing the action includes: restoring, to a current version of the storage system and using the second information for the first entity and the modification, information that was modified by the modification.

In some implementations, actions include determining, for each of one or more entity attribution factors, whether the corresponding factor applies to the likelihood that the modification is attributable to the first entity where determining the likelihood that the modification during the event of interest is attributable to the first entity from the plurality of entities uses a result of the determination, for each of the one or more account attribution factors, whether the corresponding factor applies to the likelihood that the modification is attributable to the first entity. In some implementations, determining, for each of one or more entity attribution factors, whether the corresponding factor applies to the likelihood that the modification is attributable to the first entity includes determining a value that represents the one or more entity attribution factors; and determining the likelihood that the modification during the event of interest is attributable to the first entity from the plurality of entities uses the value that represents the one or more account attribution factors. In some implementations, actions include selecting, using at least one of a system for the backup or a context for the backup and from a plurality of entity attribute factors, the one or more entity attribution factors. In some implementations, determining, for each of the one or more entity attribution factors, whether the corresponding factor applies to the likelihood that the modification is attributable to the first entity includes: determining at least one of whether a single entity has been given permission to access an account, whether the account was accessed from a single device during the event of interest, or whether access to the account is limited to the single entity. In some implementations, determining, for each of the one or more entity attribution factors, whether the corresponding factor applies to the likelihood that the modification is attributable to the first entity includes: determining whether one or more other modifications likely performed by the first entity satisfy a similarity threshold for the modification.

The subject matter described in this specification can be implemented in various implementations and may result in one or more of the following advantages. By obtaining contextual information, techniques described in this specification allow attribution of information modifications to specific entities even when accounts used to perform operations of the modifications are accessible by multiple entities. In some cases, techniques described in this specification allow attribution of information modifications to specific entities even when separate logins to the same account are not recorded in the database. Such entity-centric modification timelines can be used to selectively reconstruct changes made to information to restore portions of information modified by particular entities. This may be particularly useful in cases where an entity gains unauthorized access to an account or makes unauthorized changes to information while logged into an account with authorization to that account. In some implementations, the use of the entity-centric modification timelines can more accurately attribute modifications to a specific entity, more accurately reconstruct changes made by the specific entity, e.g., when the specific entity might use multiple accounts to make those changes, or a combination of both, compared to other systems, e.g., when log entries or other single information sources only have incomplete information.

Techniques described can include more accurately detecting deviations, anomalies, or both, that might indicate a change in behavior compared to other systems. In some implementations, the systems and methods described in this specification can more accurately detect suspicious, malicious, or both, modifications, an entity masquerading as another entity, or a combination of two or more of these, compared to other systems. For instance, an entity can log into an account on a cloud-based system and performs operations (e.g., data deletions, structure updates, configuration changes). This information can be periodically backed up to a storage system, such as a cloud storage system. Later, a different entity might log into the same account on the cloud-based system and perform operations. Techniques described can enable performing entity-centric reconstruction of modifications of stored historical information and attribute a specific modification to one of the entities with some level of likelihood, e.g., which attribution was not previously available, or was not as accurate.

In some cases, an entity enters a building that is equipped with IT systems. IT systems can have unique matches of entities with accounts (e.g., one to one). Some systems can have accounts accessible by more than one entity. Systems can record information (e.g., device identifiers, movements, noises, environmental conditions such as temperature and humidity) and this information can be periodically backed up to an information storage system. The system performs entity-centric reconstruction of modifications of stored historical information and attributes a specific modification to an entity with some level of likelihood.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of an example process of automated information reconstruction.

Like reference numbers and designations in the various drawings indicate like elements.

DETAILED DESCRIPTION

Figure 1:
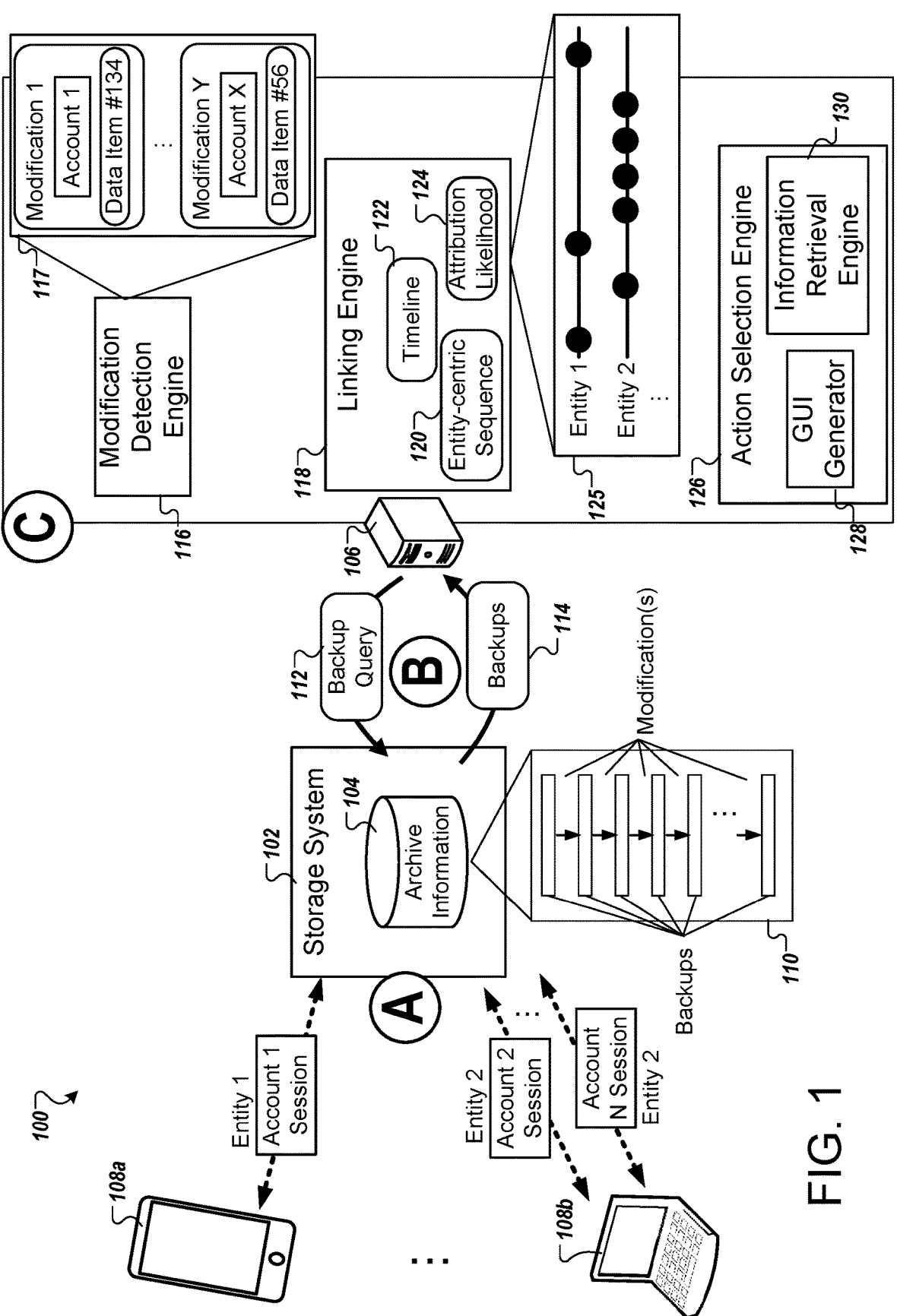
FIG. 1 depicts an example environment that includes a system for automated information reconstruction.

FIG. 1 depicts an example environment that includes an environment 100 for automated information reconstruction. The environment 100 includes a storage system 102 that stores historical archive information 104 which can generally include any form of information (e.g., data, metadata, or both, generally referred to either as information or data). The storage system 102 can be a cloud storage system—e.g., one storing information in a server accessible by one or more devices—or an offline storage system—e.g., one storing information accessible by one or more local devices connected to the storage system 102. The environment 100 includes a reconstruction system 106 configured to perform operations for automated information reconstruction. The reconstruction system 106 can be a system of one or more computers in one or more locations that operate together. The reconstruction system 106 and corresponding engines described in this specification can be configured to perform operations described in reference to FIG. 1.

In stage A of FIG. 1, devices 108a-b exchange information with the storage system 102. The devices 108a-b can exchange information that make one or more modifications to information stored in the storage system 102. The devices 108a-b can exchange information using one or more wired or wireless forms of networks that communicably connect the devices 108a-b with the storage system 102.

Entities can use the devices 108a-b to log into accounts with access to the storage system 102. Such accounts can include an Account 1, Account 2, and Account N. A first entity, "Entity 1", can have access to Account 1. A second entity, "Entity 2", can have access to Account 2 and Account N, among others. When logged into an account, entities can perform operations that modify information stored in the storage system 102. Information stored in the storage system 102 can include the archive information 104 or data for which the archive information 104 is an archive. Such modifications can be attributed to accounts and, through the linking process shown and described in reference to FIG. 1, can be attributed to entities with access to the accounts.

The storage system 102 stores the historical archive information 104 that includes multiple backups that each represent information stored at a given time—e.g., information stored before or after modifications by entities 108a-b. In some implementations, the storage system 102 records multiple backups for a single source storage system. Each of the backups can include data for multiple information modifications, e.g., which modifications were caused by devices 108a-b modifying different portions of information in the source storage system. For example, as shown in item 110, the storage system 102 can store multiple backups where each backup represents information stored in the storage system 102 at a given time—e.g., information that is stored in the storage system 102 or connected storage from a first point in time, to a subsequent point in time, but recorded at the given time. Each backup can indicate one or more modifications from a previous backup. In some implementations, information modifications trigger backups to be generated and stored in the historical archive information 104 of the storage system. In some implementations, backups are generated from time to time independent of particular modifications. For example, a backup can be generated every hour.

Differences between backups can indicate modifications. In some cases, a single backup can indicate one or more modifications—e.g., by including information that indicates an account, a type of modification, and information modified. Modifications can include adjunction, suppression, and change. Adjunction modifications can include modifications that increase or add information to an information source (e.g., a cloud environment, data from software as a service (e.g., SaaS, among others)). For example, information can be created within a cloud environment and subsequently stored within the storage system 102 and information storage for which the historical archive information 104 functions as an archive.

Suppression modifications can include modifications that decrease or remove information stored in an information source, such as the storage system 102 (e.g., a cloud environment. For example, information in the cloud environment can be overwritten or removed. Suppression modifications can be recorded within the storage system 102 and information storage for which the historical archive information 104 functions as an archive. The suppression modifications might not be removed from prior backups within the storage system 102, which allows the historical archive information 104 to function as an archive of all suppression modifications from a first point in time, to a subsequent point in time.

Change modifications can include modifications that cause information in an information source (e.g., a cloud environment) to be changed. A change modification can be considered as a global result of one or more adjunctions or suppressions. The change modifications can be recorded within the storage system 102 and information storage for which the historical archive information 104 functions as an archive. The change modifications might not be removed from prior backups within the storage system 102, which allows the historical archive information 104 to function as an archive of all change modifications from a first point in time, to a subsequent point in time. Sub-categories of the change category can include: (i) transformation, such as information being encrypted, (ii) change of state or property, such as a modification of access rights, and (iii) consumption, such as data being exported or viewed which may change exported or viewed fields or metadata stored in the storage system 102. Particular modification types can be included in an entity-centric sequence of events—e.g., indicating that a first entity performed an adjunction followed by a suppression followed by a change.

In stage B, the reconstruction system 106 obtains backups 114 from the storage system 102. Each of the backups 114 represent information stored in the storage system 102 at different points in time—e.g., a first backup of the backups 114 represents information stored at a first time and a second backup of the backups 114 represents information stored at a second time. In general, any two backups of the backups 114 are different from one another in that at least a portion of information has been modified—e.g., added, suppressed, or changed. The backups 114 can include one or more schemas or permissions indicating accounts with permissions for accessing or modifying particular portions of information.

In some implementations, the reconstruction system 106 is configured to query the storage system 102 using a backup query 112. For example, the reconstruction system 106 can query the storage system 102 for particular backups—e.g., backups within a specific time or date range, backups recorded after specific modifications, all backups, among others. The backups 114 can have features that are specified in the backup query 112—e.g., represent a state of an information source (e.g., a cloud environment) at a particular time or within a time range, correspond to information generated after specific modifications, among others.

In some implementations, the information stored in the historical archive information 104, e.g., that are associated with one or more accounts, can include information modifications that are represented in the backup 114 but are not necessarily explicitly expressed as a modification. In these implementations, a modification detection engine 116, or another component in the reconstruction system 106, can be used to detect any modifications represented by the retrieved backup 114—e.g., by processing the historical archive information 104 as described in this specification.

In some implementations, the reconstruction system 106 obtains modifications of data and metadata about one or more data objects in the backups 114 without filtering out any values in content or metadata. For instance, the reconstruction system 106 can obtain information that is broadly inclusive or expansive which can be useful for later analysis—groupings of information with characteristics that are useful for attributing modifications to entities, e.g., account access schemas indicating what accounts have access to which other accounts, information, or both; historical modifications associated with accounts and attributed to entities; or a combination of these. This obtained information can be stored in the storage system 102 or other storage device. The reconstruction system 106 can obtain the information from the storage system 102 or other storage device to supplement the archive information 104 for user attribution.

In stage C, the reconstruction system 106 processes the backups 114. In some implementations, the modification detection engine 116 of the reconstruction system 106 processes the backups 114 to determine one or more modifications—e.g., based on one or more differences in two or more of the backups 114. For example, the storage system 102 might only store backups of information over time and might not store, within a given backup, modifications that were made but modifications can be detected, e.g., by the modification detection engine 116 from data stored over time. Storing less information may allow the storage system 102 to reduce storage costs.

The modification detection engine 116 can determine modifications 117. Each modification of the modifications 117 can include an indication of an account and information modified—e.g., determined from information in the backups 114 indicating a last account that modified information. The storage system 102 can record last changes performed by accounts on information. For example, when an entity uses the Account 1 to modify Information Item #134, a backup after that modification can indicate (i) the state of the Information Item #134 at that time and (ii) the last account associated with the last change, e.g., Account 1. By comparing the Information Item #134 between sequential backups, the modification detection engine 116 can determine a type of modification that classifies the modification of Information Item #134—e.g., adjunction, suppression, and other change. The modification detection engine 116 can determine a net modification for the information, e.g., Information Item #134. The modification detection engine 116 can determine the entity that made a most recent change reflected in the net modification, e.g., the entity that used Account 1.

In some implementations, the modification detection engine 116 compares a data object of a first backup with a data object of a second backup. For example, the data objects compared can be the same data object with one or more data items modified, e.g., data fields, parameters, size, among others. In some implementations, the modification detection engine 116 identifies common data objects using an identifier, e.g., identifiers included with the data objects in the storage system 102 or an identifier generated by the modification detection engine 116 for each data object in the storage system 102 using the given data object. For example, each data object—e.g., table, vector, variable, among others—can be assigned an identifier. The modification detection engine 116 can lookup data objects in two or more backups using an identifier to compare the data objects. In some implementations, the modification detection engine 116 identifies common data objects by identifying data stored in a same location. For example, the modification detection engine 116 can identify a location of a first data object in a first backup of the backups 114. The location can be a location within a file tree indicating stored files in the storage system 102, or within a located file. The location can be a set of bits in memory used to store the data.

In some implementations, the modification detection engine 116 determines modifications based on identified differences between two or more backups of the backups 114. For example, an address field of a first data object included in both a first and second backup can be modified from the first to the second backup. The modification can be a change to the field from "Address 1" to "Address 2."

Tables 1 and 2, below, include examples of modifications determined by the modification detection engine 116.

TABLE 1

First Example Modification

```
"DataModification1": {
    "timestamp": "2022-10-21T12:42:18.000Z",
    "entityName": "Table1",
    "changeType": "CHANGED",
    "performerAccount": "FirstAccount",
    "customerName": "Jane Doe",
    "customer Address": "AddressX",
},
```

TABLE 2

Second Example Modification

```
"DataModification2": {
    "timestamp": "2022-10-21T13:14:18.000Z",
    "entityName": "Table1",
    "changeType": "CHANGED",
    "performerAccount": "FirstAccount",
    "customerName": "Jane Doe",
    "customerAddress": "Customer Address",
},
```

In the above modifications, an account of "FirstAccount" modified the field "customerAddress" twice—first changing the field to "AddressX" and then back to "Customer Address." The modification detection engine 116 can determine that no modification was performed on the "customerName" attribute because the "customerName" attribute did not show any differences across the two or more backups used to generate the above modifications.

In some implementations, the modification detection engine 116 provides modifications to a linking engine 118. The linking engine 118 can determine one or more changes made by a specific entity. For example, changes made by specific entity can occur during a current session, e.g., Entity 1 engaged in a session logged into Account 1 between device 108*a* and the storage system 102, Entity 2 engaged in a session while logged into Account 2 or Account N between device 108*b* and the storage system 102, or Entity 2 engaged in a session while logged into Account 1 (not shown). The linking engine 118 can use information from the storage system 102 to determine that a particular entity modified data even if that entity was not logged into an account corresponding to the entity, e.g., and was logged into a different performerAccount instead. Information used to determine entity attribution can include a schema stored in the storage system 102 indicating which entities have access to which accounts or information. For example, the linking engine 118 can determine that a first entity modified data of the storage system 102 while logged into the storage system 102 using a second entity's account.

In some implementations, the reconstruction system 106 detects an entity using an account, e.g., a performerAccount, that the entity does not have authorization to access. For example, the reconstruction system 106 can obtain data, such as user permissions, access control data, among others and process the obtained data to determine if an entity using an account has authorization. In some implementations, the reconstruction system 106 uses different manifestations of modifications to detect unauthorized access. For example, manifestations can include (1) the unauthorized entity making modifications to information that have never before been made by the authorized entity; (2) the unauthorized entity making modifications that are atypical—e.g., more or fewer modifications than an average number of modifications in a time period; (3) the unauthorized entity exhibiting knowledge and skills (e.g., highly technical) not previously exhibited by the authorized entity (e.g., which historically exhibited low technical knowledge, skill, or combination of both); (4) the unauthorized entity performing a pattern of actions that have been previously classified as suspicious or malicious; or (5) any combination of two or more of these. In general, the reconstruction system 106 can use rules or trained models to detect atypical behavior of entities to determine impersonation or unauthorized access. Atypical behavior can include the above manifestations. Detection of impersonation or unauthorized access can trigger the reconstruction system 106 to generate an alarm or provide data to a connected system for notifying a user or otherwise sending an alert.

The linking engine 118 can generate an entity-centric sequence 120 that includes an identification of the entity and the changes made by that entity. The linking engine 118 can generate an entity-centric sequence that includes one or more modifications detected by the modification detection engine 116. Some modifications can be attributed, otherwise referred to as linked, to multiple entities. The likelihood of each entity being the actual entity responsible for the modifications can be different. Potential entities for attribution can include any entity that can connect to or otherwise access the system. Some systems might allow access without accounts. Some systems might allow anyone access via a 'guest' account.

The risk of attributing the wrong entity to one or more modifications increases when visibility is limited to backup-in-time details without surrounding context—e.g., additional data indicating modifications by one or more entities in subsequent or prior backups. The techniques described in this specification provide a full retrospective entity—centric narrative, and clearly differentiates between entities active during one or more modifications to help determine attribution of one or more modifications.

One possible example: employees changed customer records in a database to redirect funds to themselves, stealing significant sums before being caught. Initially, one employee was committing this fraud, but then showed another employee how it worked. The second employee then started committing fraud themselves. The process can be shown graphically in entity-centric sequences 125. Dots in the figure represent modifications attributed to the given entity. The line represents passing of time. In the example case, the modifications can be fraudulent changes in the database, which can be detected as a pattern of suspicious or malicious modifications. Assumptions that one entity is responsible for all such activities are dangerous in an investigation, potentially missing accomplices or implicating the wrong person.

The linking engine 118 can generate a timeline 122. For example, the timeline 122 can include one or more timestamps corresponding to changes for a given user account. In some implementations, the timeline 122 is included in the entity-centric sequence 120.

In some implementations, the linking engine 118 generates an attribution likelihood score 124. For example, the linking engine 118 can determine one or more factors that support or do not support an entity having made a modification. These factors can be referred to as entity attribution factors. Factors can be used to determine a score from the factors, e.g., as a function of values of the factors, e.g., a first or higher degree polynomial of the factors, e.g., with coefficients determined heuristically or by a training process, or, e.g., a ratio $$\frac{\sum_{f=a}^{b} Cf}{\sum_{f=a}^{b} Df}$$

where the numerator is the sum of factors contributing to the strength of attribution (Cf) and the denominator is the sum of factors detracting from the strength of attribution (Df).

A non-exhaustive list of example factors is included in Table 3, below. The types of information and values used to determine one or more factors can depend on a given storage system, an event of interest, or both. Some factors might be present or absent given capabilities, limitations, or both, of a given system. Some factors can be selected, e.g., by the linking engine 118, using the detected modifications. In some examples, factors can be related to an event of interest—e.g., a collection of related things that have happened within a cloud environment during a specified time period.

an entity, (ii) other modifications performed within a time period of a modification to be attributed to an entity, (iii) other data linked to modifications resulting from a modification to be attributed to an entity, or (iv) types of other modifications (e.g., data corruption, suppression, encryption, among others) resulting from a modification to be attributed to a user or within a time period of the modification to be attributed to an entity.

TABLE 3

| Example Factors | |
| --- | --- |
| Factors contributing to attribution | Factors detracting from attribution |
| Entity limited to one account | Multiple entities sharing an account |
| No ability for entity to switch accounts | Administrative entity with ability to switch accounts |
| One entity throughout event of interest, e.g., accessing information | Mix of entities making modifications |
| Entity had access or permissions necessary to make the modifications | Entity did not have access or permissions necessary to make the modifications |
| Entity made multiple modifications consistently or continuously over time | Singular event without surrounding context |
| Entity made no attempt to conceal behavior | Entity attempted to conceal behavior, e.g., through detection of log data erasure |

The reconstruction system 106 can use any appropriate data, process, or combination of both, to determine whether multiple entities are sharing access to an account. In some cases, multi-factor authentication or crypto key access might make it harder for an entity to use a different account. For example, the factor of an entity being limited to one account can be determined by obtaining information indicating that a system storing data requires a form of authentication before access. The factor of multiple entities sharing an account can be determined, e.g., by the linking engine 118, using information indicating a configuration of the storage system 102, from modifications of information, or a combination of both. In some instances, backups can include information about devices that access a system which can be used to determine if devices are being shared between two or more entities. Sharing devices can be a factor detracting from attribution from a particular entity given a modification made by an account to which the particular entity has access.

In some implementations, the linking engine 118 assigns a value to a factor—e.g., 0 or 1, among others—depending on whether a given factor is satisfied or not and uses the value to calculate the score. For example, the linking engine 118 can determine that an administrative user has access to an account that performed a modification. This can be a contributing factor for attributing the modification to the administrative user and a detracting factor for attributing the modification to a non-administrative user corresponding to the account that performed the modification.

The linking engine 118 can identify factors contributing to or detracting from user attribution or account attribution—e.g., determining a user account associated with a modification actually performed the modification. Cases where an account recorded as making a modification did not actually make the modification can include cases of fraud, obfuscation, storage system error, among others.

The reconstruction system 106 can use data of the storage system 102 to determine one or more factors supporting or detracting from attribution. For example, the reconstruction system 106 can obtain data—e.g., in the backups 114—that includes data indicating (i) past modifications performed by One innovation of the techniques used by the reconstruction system 106 to attribute modifications to entities is, instead of solely relying on a snapshot-in-time perspective of log analysis and change data capture, to obtain and use for attribution a broader visibility enabled by fully reconstructing a retrospective entity-centric narrative using changes across historical archives from storage systems—e.g., cloud environments.

Reconstruction of historical account-level activity supports trend and time series analysis to detect deviations or anomalies that might indicate a change in behavior or someone masquerading as the entity. Reconstruction of historical relational activities supports root cause analysis and forward tracking, e.g., error propagation. For instance, when a problem is detected in later data generated from previously stored data, the reconstruction system 106 can identify a root cause, e.g., who changed what when. Once a root cause is determined, the reconstruction system 106 can perform analysis of information to ascertain what other errors were propagated from the root cause.

In some cases, a root cause analysis can be performed to determine whether an unauthorized entity is likely making malicious modifications to information. The reconstruction system 106, e.g., the information retrieval engine 130, can automatically reconstruct the malicious modifications and attribute them to the unauthorized entity (e.g., a root cause of one or more problems that may have been detected after the modifications were made) and then can reconstruct other modifications made by the unauthorized entity to determine a full scope of the problem. Although referred to as an unauthorized entity, the reconstruction system 106 might not have data indicating an identity of the unauthorized entity, but rather than an unknow unauthorized entity likely made malicious modifications to information.

In some implementations, an action selection engine 126 of the reconstruction system 106 selects an action to be performed in response to one or more linked modifications determined by the linking engine 118. For example, the action selection engine 126 can include a graphical user interface (GUI) generator 128 configured to generate a GUI representing data that indicates modifications determined from the backups 114. A GUI generated by the GUI generator 128 can be provided to a device of a user where the device of the user is configured to present the GUI to a user of the device. The action selection engine 126 can include an information retrieval engine 130. The information retrieval engine 130 can be configured to retrieve at least a portion of information modified by one or more devices—e.g., devices 108a-b. The information retrieval engine 130 can perform one or more inverse modifications—e.g., modifications that revert one or more previously performed modifications—to generate a restored portion of information. In some cases, the information retrieval engine 130 restores information— e.g., information modified by one or more modifications attributed to an entity.

In some implementations, the information retrieval engine 130 restores information in response to determining that an entity, without authorized access to a portion of data, modified that data. For example, the entity might have been pretending to be another entity by logging into another account available to that entity. By performing processes described in reference to FIG. 1, the reconstruction system 106 can determine an attribution of one or more modifications where the attribution might attribute an entity that does not match an account recorded as performing the modification—e.g., the attributed entity might not be a primary entity or even an entity with authorized access. In some implementations, the reconstruction system 106 generates an alert indicating that restoration was performed, attribution was determined, or a combination of both, for one or more modifications.

In some implementations, only attributions that satisfy a likelihood score threshold are used to perform one or more actions. For example, the GUI generator 128 can generate a GUI element indicating that a modification was performed by user A in response to an attribution likelihood indicating the Entity A performed the modification satisfying a likelihood threshold. The information retrieval engine 130 can restore data in response to an attribution likelihood, indicating that unauthorized Entity X performed an unauthorized modification of the information, satisfying a likelihood threshold. A likelihood threshold can be satisfied, e.g., if an attribution likelihood is greater than or equal to 95%. In some implementations, scores for attributing a modification to an entity that satisfies a first threshold are included in an entity-centric sequence—e.g., the entity-centric sequence 120. In some implementations, scores for attributing a modification to an entity that satisfies a second threshold are used to perform one or more actions, where the first threshold and the second threshold are different.

In some implementations, the information retrieval engine 130 communicates with the storage system 102 to restore one or more portions of information. For example, the information retrieval engine 130 can communicate with the storage system 102 to perform one or more inverse modifications on portions of information identified by the information retrieval engine 130.

The environment 100 is an example of a system implemented as computer programs on one or more computers in one or more locations, in which the systems, components, and techniques described in this specification are implemented. The user devices 108a-b can include personal computers, mobile communication devices, and other devices that can send and receive data over a network. The network (not shown), such as a local area network ("LAN"), wide area network ("WAN"), the Internet, or a combination thereof, can connect the user devices 108a-b, the storage system 102, and the reconstruction system 106. The environment 100 can use a single computer or multiple computers operating in conjunction with one another, including, for example, a set of remote computers deployed as a cloud computing service.

The reconstruction system 106 can include several different components, including the modification detection engine 116, the linking engine 118, and the action selection engine 126. The modification detection engine 116, the linking engine 118, or the action selection engine 126, or a combination of these, can be implemented in code.

The various components of the reconstruction system 106 can be installed on one or more computers as separate components or as different modules of a same component. For example, components including the modification detection engine 116, the linking engine 118, and the action selection engine 126 of the reconstruction system 106 can be implemented as computer programs installed on one or more computers in one or more locations that are coupled to each through a network. In cloud-based systems for example, these components can be implemented on individual computing nodes of a distributed computing system.

In some implementations, the reconstruction system 106 includes one or more modules configured to operate machine learning models or algorithms to process data obtained from the storage system 102. For example, the reconstruction system 106 can operate a machine learning model that is trained to detect attribution of one or more modifications. The reconstruction system 106 can use ground truth datasets indicating modifications known to be performed by a given entity. The machine learning model can use historical data—e.g., included in the backups 114— indicating a number of previous modifications, active entities, time of day, among other data to generate an attribution likelihood for a given entity. The machine learning model can be trained, e.g., by the reconstruction system 106, on historical data to group entities into a specific class. For example, the machine learning model can group entities into classifications. The classifications can represent a pattern associated with the modifications such as (Normal, Administrator, Automation, or a combination of these.

In some implementations, the reconstruction system 106 identifies information affected by modifications. For example, the reconstruction system 106 can identify information modified subsequent to one or more other modifications. In the case of modifications performed fraudulently in the storage system 102, the reconstruction system 106 can identify what modifications on the information were subsequently performed. The reconstruction system 106 can identify all modifications before generating inversed modifications or restoring the modified information to a condition prior to one or more unauthorized modifications.

FIG. 2 is a flow diagram of an example process of information reconstruction. For example, the process 200 can be performed by the reconstruction system 106. The process 200 covers user attribution in cases including: (i) attributing a modification to an entity where the entity accesses multiple accounts to perform multiple modifications and (ii) attributing a modification to an entity where the modification was performed by an account that is accessible to entities other than the entity.

The process 200 includes obtaining backups (202) relating to information stored on a storage system. For example, the reconstruction system 106 can obtain backups 114 from the storage system 102.

The process 200 includes determining one or more modifications using the backups (204). For example, the modification detection engine 116 of the reconstruction system 106 can determine one or more differences from the backups 114, including one or more differences to a given data object that is represented by at least two of the backups 114. The data object can include data values for an entity and the difference can include a change in one or more of the data values. The difference can be a result of operations performed by users while logged into accounts with access to the system 102.

The process 200 includes linking an entity with one or more accounts that performed an operation of the one or more modifications (206). For example, the linking engine 118 of the reconstruction system 106 can determine the entity-centric sequence 120. The entity-centric sequence 120 can represent a number of modifications performed by an entity. The entity can be one that has access to multiple accounts.

The process 200 includes determining a likelihood that the entity initiated each operation of the operations while logged into one of the one or more accounts (208). For example, the linking engine 118 can generate an attribution likelihood score 124. The attribution likelihood score 124 can represent a likelihood that a given entity performed one or more modifications. The linking engine 118 can determine values for one or more factors and use the values to generate the attribution likelihood score 124 for one or more entities. The linking engine 118 or action selection engine 126 can determine if one or more attribution likelihood scores satisfies a threshold—e.g., above 97%, or dynamic threshold, such as k-mean clustering, among others.

The process 200 includes performing, in response to determining whether the score satisfies a threshold, an action (210). In response to determining whether or not one or more attribution likelihood scores satisfy the threshold for a particular entity, the action selection engine 126 can perform subsequent actions—e.g., generate a GUI using the GUI generator 128 as described in reference to FIG. 1, or restore information, either automatically or with user authorization, using the information retrieval engine 130, among others. An action can include generating and providing an alert to one or more devices where the alert indicates an attribution, action recommended or taken, or attribution of one or more modifications to an entity.

The order of operations in the process 200 described above is illustrative only and can be performed in different orders. In some implementations, the process 200 can include additional operations, fewer operations, or some of the operations can be divided into multiple operations.

In this specification the term "engine" refers broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

A number of implementations have been described. Nevertheless, it will be understood that various modifications may be made without departing from the spirit and scope of the disclosure. For example, various forms of the flows shown above may be used, with operations re-ordered, added, or removed.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., a Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular implementations of the invention have been described. Other implementations are within the scope of the following claims. For example, the operations recited in the claims, described in the specification, or depicted in the figures can be performed in a different order and still achieve desirable results. In some cases, multitasking and parallel processing may be advantageous.

In another embodiment, information may comprise cloud-based information storage in Software as a Service (SaaS) such as Salesforce. In another embodiment, information may comprise cloud-based file storage services such as GOOGLE DRIVE. In another embodiment, information may comprise one or more object storage services such as Simple Storage Service (S3) virtual machine (VM) instances that a cloud provider (e.g., AMAZON WEB SERVICES™, provided by AMAZON.COM, INC., 410 Terry Avenue North, Seattle, WA, USA) can deploy so as to provide Infrastructure as a service (IaaS). In another embodiment, information may comprise building security monitoring systems that rely on IT systems to capture and store information in the cloud.

What is claimed is:

1. A method comprising:

determining, using a first backup of information that was stored in a storage system during a first time period and a second backup of information that was stored in the storage system during a second time period, two or more net modifications between the first backup and the second backup;

attributing, for each of the two or more net modifications, the net modification to an entity from a plurality of entities and that made a most recent change reflected in the net modification, wherein the attributing is performed based on a schema indicating which entities of the plurality of entities have access to one or more accounts and one or more sets of information stored in the storage system;

determining, for an event of interest and using first data that indicates the net modifications attributed to each of the corresponding entities, a likelihood that a modification during the event of interest is attributable to a first entity from the plurality of entities, wherein the likelihood that the modification is attributable to the first entity is calculated based on a ratio of contributing and detracting attribution factors corresponding to the first entity, and wherein the event of interest comprises an access to information in the storage system;

determining whether the likelihood satisfies a likelihood criterion; and performing, in response to determining that the likelihood satisfies the likelihood criterion, an action for the event of interest using the second backup of information for the first entity and the modification.

2. The method of claim 1, wherein determining the likelihood comprises:

detecting, from the plurality of entities and using the first data that indicates the net modifications attributed to each of the corresponding entities, a subset of entities that each made at least one modification from the two or more net modifications between the first backup and the second backup; and determining, for two or more entities in the subset of entities, a corresponding likelihood that the modification during the event of interest is attributable to the corresponding entity.

3. The method of claim 2, wherein the likelihood criterion comprises a likelihood threshold or a highest likelihood from the corresponding likelihoods for the subset of entities.

4. The method of claim 2, wherein detecting the subset of entities comprises detecting the subset of entities that each likely made at least one modification during the event of interest.

5. The method of claim 1, further comprising:

determining, for the event of interest and using the first data that indicates the net modifications attributed to each of the corresponding entities, a second likelihood that a second modification during the event of interest is attributable to a second entity from the plurality of entities;

determining whether the second likelihood satisfies the likelihood criterion; and using a result of the determination whether the second likelihood satisfies the likelihood criterion, determining whether to perform a second action for the event of interest using third data for the second entity and the second modification.

6. The method of claim 1, wherein performing the action comprises:

restoring, to a current version of the storage system and using the second backup of information for the first entity and the modification, information that was modified by the modification.

7. The method of claim 1, comprising:

determining, for each of one or more entity attribution factors, whether the corresponding factor applies to the likelihood that the modification is attributable to the first entity, wherein determining the likelihood that the modification during the event of interest is attributable to the first entity from the plurality of entities uses a result of the determination, for each of the one or more entity attribution factors, whether the corresponding factor applies to the likelihood that the modification is attributable to the first entity.

8. The method of claim 7, wherein determining whether the corresponding factor applies includes:

determining a value that represents the one or more entity attribution factors; and determining the likelihood that the modification during the event of interest is attributable to the first entity from the plurality of entities using the value that represents the one or more entity attribution factors.

9. The method of claim 7, further comprising:

selecting, using at least one of a system for the backup or a context for the backup and from a plurality of entity attribute factors, the one or more entity attribution factors.

10. The method of claim 7, wherein determining whether the corresponding factor applies includes:

determining at least one of whether a single entity has been given permission to access an account, whether the account was accessed from a single device during the event of interest, or whether access to the account is limited to the single entity.

11. The method of claim 7, wherein determining, for each of the one or more entity attribution factors, whether the corresponding factor applies to the likelihood that the modification is attributable to the first entity comprises:

determining whether one or more other modifications likely performed by the first entity satisfy a similarity threshold for the modification.

12. A non-transitory computer-readable medium having instructions stored thereon that are capable of causing a computing device to implement operations comprising:

determining, using a first backup of information that was stored in a storage system during a first time period and a second backup of information that was stored in the storage system during a second time period, two or more net modifications between the first backup and the second backup;

attributing, for each of the two or more net modifications, the net modification to an entity from a plurality of entities and that made a most recent change reflected in the net modification, wherein the attributing is performed based on a schema indicating which entities of the plurality of entities have access to one or more accounts and one or more sets of information stored in the storage system;

determining, for an event of interest and using first data that indicates the net modifications attributed to each of the corresponding entities, a likelihood that a modification during the event of interest is attributable to a first entity from the plurality of entities, wherein the likelihood that the modification is attributable to the first entity is calculated based on a ratio of contributing and detracting attribution factors corresponding to the first entity, and wherein the event of interest comprises an access to information in the storage system;

determining whether the likelihood satisfies a likelihood criterion; and performing, in response to determining that the likelihood satisfies the likelihood criterion, an action for the event of interest using second information for the first entity and the modification.

13. The non-transitory computer-readable medium of claim 12, wherein determining the likelihood comprises:

detecting, from the plurality of entities and using the first data that indicates the net modifications attributed to each of the corresponding entities, a subset of entities that each made at least one modification from the two or more net modifications between the first backup and the second backup; and determining, for two or more entities in the subset of entities, a corresponding likelihood that the modification during the event of interest is attributable to the corresponding entity.

14. The non-transitory computer-readable medium of claim 13, wherein the likelihood criterion comprises a likelihood threshold or a highest likelihood from the corresponding likelihoods for the subset of entities.

15. The non-transitory computer-readable medium of claim 13, wherein detecting the subset of entities comprises detecting the subset of entities that each likely made at least one modification during the event of interest.

16. The non-transitory computer-readable medium of claim 12, wherein the operations further comprise:

determining, for the event of interest and using the first data that indicates the net modifications attributed to each of the corresponding entities, a second likelihood that a second modification during the event of interest is attributable to a second entity from the plurality of entities;

determining whether the second likelihood satisfies the likelihood criterion; and using a result of the determination whether the second likelihood satisfies the likelihood criterion, determining whether to perform a second action for the event of interest using third data for the second entity and the second modification.

17. The non-transitory computer-readable medium of claim 12, wherein performing the action comprises:

restoring, to a current version of the storage system and using the second backup of information for the first entity and the modification, information that was modified by the modification.

18. The non-transitory computer-readable medium of claim 12, wherein the operations comprise:

determining, for each of one or more entity attribution factors, whether the corresponding factor applies to the likelihood that the modification is attributable to the first entity, wherein determining the likelihood that the modification during the event of interest is attributable to the first entity from the plurality of entities uses a result of the determination, for each of the one or more entity attribution factors, whether the corresponding factor applies to the likelihood that the modification is attributable to the first entity.

19. The non-transitory computer-readable medium of claim 18, wherein determining whether the corresponding factor applies includes:

determining a value that represents the one or more entity attribution factors; and determining the likelihood that the modification during the event of interest is attributable to the first entity from the plurality of entities using the value that represents the one or more entity attribution factors.

20. A system comprising one or more computers and one or more storage devices on which are stored instructions that are operable, when executed by the one or more computers, to cause the one or more computers to perform operations comprising:

determining, using a first backup of information that was stored in a storage system during a first time period and a second backup of information that was stored in the storage system during a second time period, two or more net modifications between the first backup and the second backup;

attributing, for each of the two or more net modifications, the net modification to an entity from a plurality of entities and that made a most recent change reflected in the net modification, wherein the attributing is performed based on a schema indicating which entities of the plurality of entities have access to one or more accounts and one or more sets of information stored in the storage system;

determining, for an event of interest and using first data that indicates the net modifications attributed to each of the corresponding entities, a likelihood that a modification during the event of interest is attributable to a first entity from the plurality of entities, wherein the likelihood that the modification is attributable to the first entity is calculated based on a ratio of contributing and detracting attribution factors corresponding to the first entity, and wherein the event of interest comprises an access to information in the storage system;

determining whether the likelihood satisfies a likelihood criterion; and performing, in response to determining that the likelihood satisfies the likelihood criterion, an action for the event of interest using second information for the first entity and the modification.

\* \* \* \* \*